Sept. 27, 1960     C. A. MAYNARD     2,953,970
MOUNT FOR OPTICAL SYSTEM COMPONENT
Filed Sept. 26, 1957     2 Sheets-Sheet 1
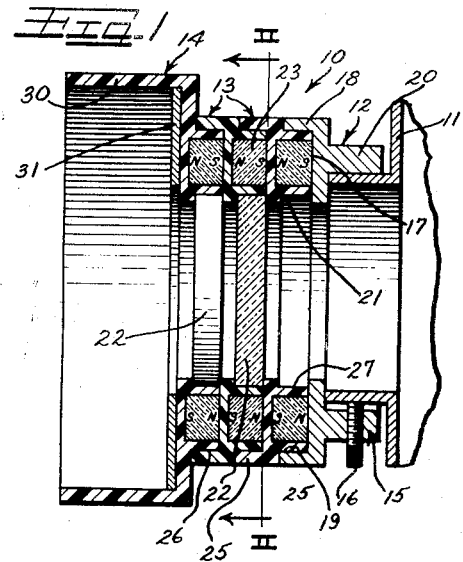
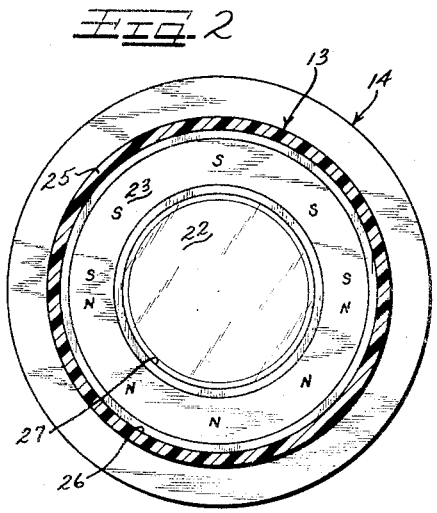
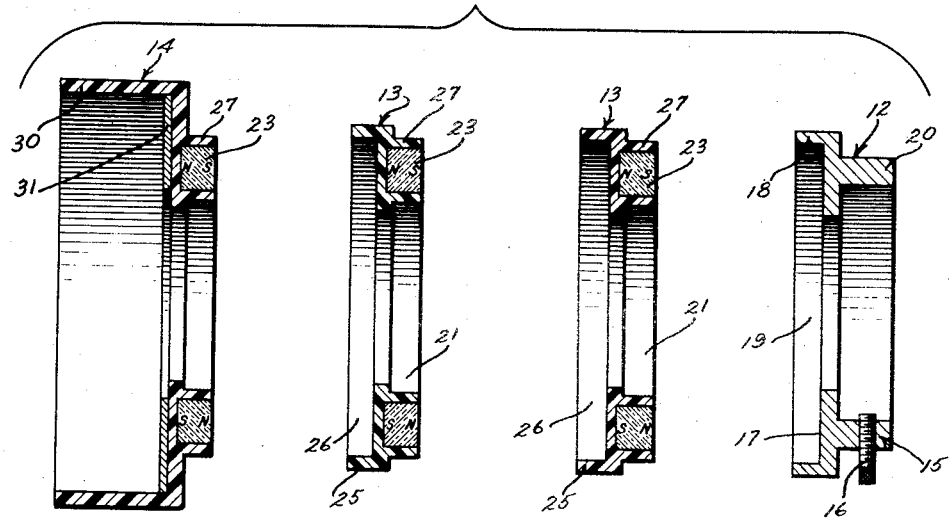
Inventor
CHARLES A. MAYNARD Sept. 27, 1960    C. A. MAYNARD    2,953,970
MOUNT FOR OPTICAL SYSTEM COMPONENT
Filed Sept. 26, 1957    2 Sheets-Sheet 2

Inventor
CHARLES A. MAYNARD

United States Patent Office 2,953,970
Patented Sept. 27, 1960

2,953,970

MOUNT FOR OPTICAL SYSTEM COMPONENT

Charles A. Maynard, Valparaiso, Ind., assignor to Indiana General Corporation

Filed Sept. 26, 1957, Ser. No. 686,340

6 Claims. (Cl. 88—113)

This invention relates generally to a mount for attaching an optical element to an optical system, and more specifically to a mount assembly having an improved adapter ring, retaining rings, and the like incorporated therein.

Although the principles of the present invention may be included in various optical systems, a particularly useful application is made in optical devices such as cameras, spotlights, and projectors. In particular, when such devices are utilized, provision has frequently been made for attaching auxiliary optical elements aligned with the optical path of the device. It is frequently desired to change or remove the auxiliary element, such elements usually being held by a threaded retaining ring which engages with the device itself or with a part of a mount.

The present invention contemplates the utilization of one or more rings, such as adapter rings, retaining rings, step-up rings, step-down rings, and sunshades, wherein a permanent magnet is incorporated in at least one of such rings or in the device with which the rings are used, to securely hold the various removable components of the mount or mount assembly in the proper relative position.

The term "optical element," as used herein, refers to such elements as filters used to alter the frequency and/or intensity of light transmitted, polarizing filters, closeup or portrait lenses, and any auxiliary lens used in front of the lens of an optical device or system. Thus this invention is directed to the mount for attaching such elements to the optical lens device, the specific nature of the element itself not comprising a part of the instant invention.

The term "optical system" as used herein, refers to such lens devices as cameras, projectors, spotlights, or any other device having an aperture through which light passes, and with respect to which it is desired to mount an auxiliary optical element.

Accordingly, it is an object of the present invention to provide a means for mounting an optical element with respect to an optical system.

Another object of the present invention is to provide a mount assembly for attaching an accessory to an optical system, wherein the various components are held together by magnetic attraction.

Yet another object of the present invention is to provide a means for supporting a retaining ring with respect to an optical system.

A still further object of the present invention is to provide a means for supporting a plurality of accessories in alignment with an optical system.

Still another object of the present invention is to provide a means for increasing the force by which various components of an accessory mount are held together.

A still further object of the instant invention is the provision of a mount for optical accessories comprising removable and interchangeable components which may be relatively positioned to be held together, and which may be repositioned to be separated.

Many other advantages, features and additional objects of the present invention will become manifest to those versed in the art upon making reference to the detailed description and the accompanying drawings in which a preferred structural embodiment incorporating the principles of the present invention is shown by way of illustrative example.

On the drawings:

Figure 1 is cross-sectional view of an optical mount assembly equipped with magnets provided in accordance with the principles of the present invention;

Figure 2 is a view taken along line II—II of Figure 1;

Figure 3 is a cross-sectional view, generally similar to Figure 1, but with the principal components thereof spaced apart;

As shown in the drawings:

Figure 4:
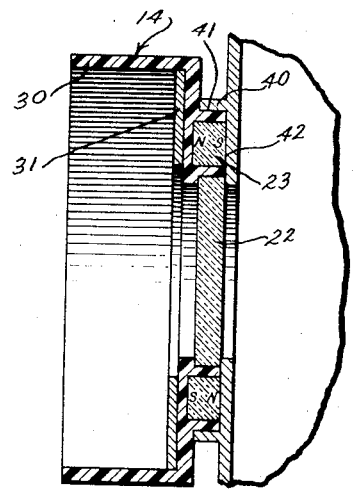
Figure 4 illustrates a slight modification of the embodiment shown in Figures 1-3.

The principles of this invention are particularly useful when embodied in an optical filter mount such as shown in Figure 1 and generally indicated by the numeral 10. The mount 10 may be attached to any one of various devices, such as, but not limited to, cameras, projectors and spotlights, herein referred to collectively as optical systems. The optical system typically includes a barrel ring 11 or is otherwise adapted in a similar way to receive the mount. The mount 10 may include one or more rings adapted to receive optical elements, to serve as an adapter, and/or to serve as a sunshade. It is to be understood that as many or as few of the various functions may be selected as may be desired by the user who selects the various rings desired by him at a given time.

One such selection of elements has been combined as is shown in Figure 1, and includes an adapter ring 12, two identical retaining rings 13, 13, and a modified retaining ring or sunshade 14. The various rings 12—14 are disposed in optical alignment with the barrel ring 11 of the optical system.

The adapter ring 12 is provided with a means 15 for attaching the adapter ring to the barrel ring 11. In the instant figure, the adapter ring 12 slips onto the barrel ring 11 and is secured thereto by a set screw 16. It is to be understood that this means for attachment is illustrative and that other means may be incorporated in the adapter ring 12 for this purpose. Some of the other modes of attachment include a threaded connection between the adapter 12 and the barrel ring 11, resilient frictional prongs carried by one of such rings and engaging the other, and the like. Further, the adapter 12 may be made integral with respect to the barrel ring 11, or the optical system may be provided with the essential characteristics of the adapter ring 12 set out more fully later herein. However, the connection between the adapter and the barrel ring may also include the novel features described later herein which join other adjacent rings together. The preferred embodiment of the instant invention employs a separate adapter ring which may be constructed to fit a wide variety of sizes and shapes of barrel rings. It is common for the barrel ring 11 to comprise non-magnetic material, and where this be the case, it is necessary to utilize the adapter ring 12. While the adapter ring 12 may be constructed of any suitable material, it necessarily includes a magnetically permeable portion 17. The material of which the portion 17 is made may be used for the entire ring, or it may be provided at the point indicated as by an insert. The adapter ring 12 may include a tubular portion 18 which defines an aligned recess 19. It typically also includes a second tubular portion or projection 20 comprising part of the means 15 for attachment of the ring 12 to the barrel ring 11.

The second tubular projection 20 normally engages telescopically with the barrel ring 11. In the instant embodiment, the tubular projection is shown receiving the barrel ring 11. Of course, it is to be understood, that this arrangement could be reversed so that the barrel ring 11 receives the tubular projection 12 telescopically. The tubular projections 18 and 20 are disposed in generally concentric relationship to each other. Thus the magnetically permeable portion 17 could also be part of the optical system, or be part of the barrel ring 11. As such, it could be integral therewith or be a separate member rigidly associated with the barrel ring.

Any number, including one or more, of retaining rings 13 may be utilized at a given time. The retaining ring 13 is adapted as at 21 to receive and support an optical element, such as an optical filter 22. For the sake of clarity, the element 22 has been omitted from the right hand retaining ring 13. Each of the retaining rings 13 is disposed adjacent to the adapter ring 12 and aligned therewith. Each of the rings 13 includes a permanently magnetic portion 23 here shown to comprise an annular ring of ceramic permanent magnetic material. The permanently magnetizable ceramic material of which the ring 23 may be made is commercially available under several names including "Indok" and "Ferroxdure" and can be fabricated into the desired shape by compacting a finely ground mixture of the raw material followed by sintering, as taught by Went et al., No. 2,762,777. The permanent magnet 23 is rigidly disposed within the ring 13 for attraction with respect to the magnetically permeable portion 17. The magnetic portion 23 may comprise a number of individual magnets, or be a single magnet as shown. Since individual retaining rings 13 are preferably made substantially identical to each other, it will be noted that adjacent rings contain a permanently magnetic portion 23, the poles of which are each directed to an unlike pole in the adjacent ring.

It is preferable to have both a north pole and a south pole directed in each of the two axial directions. Thus there is a plurality of unlike poles directed in each of the axial directions. When the magnet 23 comprises ceramic material, the magnet can be magnetized with unlike poles immediately adjacent to each other as shown in Figure 2, since the material has an unusually strong resistance to demagnetization. When adjacent retaining rings 13 are disposed as shown in Figure 1, the various unlike poles will be attracted toward each other to thereby support the one ring with respect to the next. When the one retaining ring is rotated with respect to the other retaining ring, in this example 180 degrees, similar poles will be aligned to cause a repelling force between the adjacent rings which force aids disassembly. Thus also the rings may be rotated to a point of equilibrium or non-attraction between the rings.

It is to be understood that other arrangements of poles, either within a unitary member, or by means of a segmented magnet, may be utilized to achieve this result. While Figure 1 shows the preferred embodiment, other advantageous embodiments may include having the poles directed radially rather than axially.

Each of the retaining rings 13 includes a tubular projection 25 which defines an aligned recess 26 for telescopically receiving an additional similar ring. Thus the recess 26 may be substantially identical to the recess 19. The retaining ring 13 includes a second tubular projection 27 which serves as a pilot to be received in the recesses 19 and 26 of the other rings. It is to be understood that the recess may be provided in the outer one of a pair of rings, with the pilot outwardly disposed from the inner of the rings. Thus the various rings are telescopically received in a recess for alignment and support.

The outermost retaining ring 14, when not provided with an optical element, comprises a sunshade. Thus the ring 14 has a tubular projection 30 extending in a generally axial direction away from the barrel ring 11. The ring 14 may be provided with a magnetically permeable bridging member 31, here shown to comprise a flat ring disposed within the ring most remote from the permeable portion 17. Thus, in the instant embodiment, the bridging member 31 bridges the poles which are most remote from the magnetically permeable portion 17. When the bridging member 31 spans poles of opposite polarity, it reduces the reluctance between them, providing a more permeable path for the lines of flux, and thereby increasing the attraction between the various magnets and the permeable portion 17. It is to be understood that the magnetically permeable bridging member 31 may be combined integrally with the ring 14 by constructing the ring 14 of such material.

It is to be understood that each of the rings disclosed herein may have milled, knurled, or tapered exterior surfaces, be provided with index marks, or be made in shorter axial lengths as is conventionally done, such feature not comprising a part of the instant invention. The term "tapered" as used in the preceding sentence refers to the providing of external clearance with respect to a view finder, diaphragm adjustment, focusing ring, and the like.

It is to be further understood, that the various mutually telescoping rings need not all have the same diameter of recess and pilot portion, if such be provided, whereby such rings may be used as step-up or step-down rings, either with or without an optical element received therein.

The operation of the mount assembly 10 is apparent from the description of the foregoing typical components. The adapter ring 12, if one be used, is attached by conventional means to the barrel ring 11 or is permanently carried thereon. Likewise, it may also be provided with the novel magnet structure disclosed herein, either integrally within the ring 12 or within the barrel ring 11. Then such retaining rings as may be desired are added telescopically together. This may include a single filter, two filters, a single sunshade, and/or variations and extensions thereof. In the instant embodiment, the entire mount assembly 10 may be rotated with respect to the barrel ring 11, and the retaining ring 13 which is received by the adapter 12 may be rotated with respect thereto. However, the other retaining ring 13 or the ring 14, when rotated with respect to a ring which also has magnets, becomes free when the magnetic forces are in equilibrium and is actually repelled away when like poles become aligned.

Referring to Figure 4, there is shown a structure wherein the optical system is constructed to receive the various retaining rings directly. This includes a barrel ring 40 defining a recess 41 and which has a magnetically permeable portion 42 directly adjacent thereto for coaction with the retaining ring assembly received in the recess 41.

Figure 5:
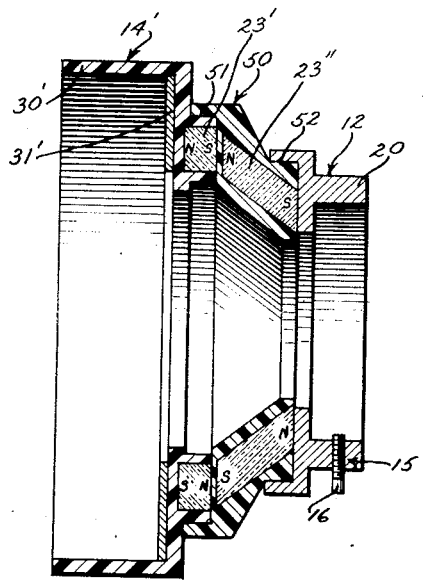
Figure 5 illustrates a further modification which may be included in the structure of Figures 1-3.

Referring to Figure 5, a retaining ring 50 is illustrated wherein the recess 51 is somewhat larger than the recess 52 in the adapter. Thus this ring may be used, either with or without an optical element, to step up the size of elements being used. The same principles may be used to provide a step-down ring.

Accordingly, a filter mount has been provided, which is simple, has readily interchangeable components, and is easily manufactured. The principal material which supports the magnetic portions may comprise plastic, die cast aluminum, zinc, or other non-magnetic materials which may be readily molded or machined. The magnet is preferably cemented, pressed, or integrally molded within the various rings. The dimensions of the magnet in this structure are not critical, and the device can be produced by conventional methods without high cost, but with precision.

Although various minor modifications, many of which have been suggested herein, might be suggested by those versed in the art, it should be understood that I wish to embody within the scope of the patent warranted hereon, all such embodiments as reasonably and properly come within the scope of my contribution to the art.

I claim as my invention:

1. A mount for supporting an optical element with respect to a barrel ring of an optical system, said mount comprising in combination: A magnetically permeable portion, and a permanently magnetic portion; said permanently magnetic portion comprising an annular ceramic permanent magnet having an annular pattern of permanent magetization substantially coaxial with said barrel ring and with magnetic poles extending in both axial directions; and an optical element retainer ring assembly adapted to support the optical element, and having a continuous coaxial surface of revolution engageable in an axial direction with said system and disposed substantially coaxially with said barrel ring, said optical element retainer ring assembly rigidly incorporating one of said portions; one end of said magnetic portion terminating substantially in said surface of revolution for acting magnetically directly in an axial direction on said magnetically permeable portion to support said retainer ring assembly, and said optical element retainer ring assembly being selectably rotatable about its axis to any angular position with respect to the barrel ring.

2. A mount for supporting an optical element with respect to a barrel ring of an optical system, said mount comprising in combination: An adapter ring adapted to be attached to the barrel ring in optical alignment therewith, said adapter ring having a tubular projection defining a recess coaxially aligned therewith and having a bottom directed away from the barrel ring, said adapter ring including a magnetically permeable portion rigidly disposed at the bottom of said recess; and an optical element retainer ring assembly adapted to support the optical element, and having a continuous coaxial surface of revolution telescopically and coaxially receivable within said adapter recess and adapted to engage the bottom of said recess in said adapter ring in an axial direction; said optical element retainer ring assembly rigidly including an annular permanent magnet having a coaxial cylindrical magnetic field defined by magnetic poles extending in both axial directions, each pole at one end of said magnet terminating substantially in said surface of revolution for acting magnetically directly in an axial direction on said magnetically permeable portion in said adapter ring to support said retainer ring assembly, and said assembly being selectably rotatable as a unit about its axis to any angular position with respect to said adapter.

3. A mount for supporting an optical element with respect to a barrel ring of an optical system, said mount comprising in combination: An adapter ring adapted to be attached to the barrel ring in optical alignment therewith; and an optical element retainer ring assembly adapted to support the optical element, and including a retainer ring; said rings each having a tubular projection defining a recess coaxially aligned therewith and having a bottom directed away from the barrel ring; said adapter ring including a magnetically permeable portion rigidly disposed at the bottom of its recess; said retainer ring assembly having a continuous coaxial surface of revolution telescopically and coaxially receivable within said adapter recess and adapted to engage the bottom of said recess in said adapter ring in an axial direction; said optical element retainer ring assembly rigidly including an annular ceramic permanent magnet having a coaxial cylindrical magnetic field defined by magnetic poles extending in both axial directions, each pole at one end of said magnet terminating substantially in said surface of revolution for acting magnetically directly in an axial direction on said magnetically permeable portion in said adapter ring to support said retainer ring assembly, and said assembly being selectably rotatable as a unit about its axis to any angular position with respect to said adapter; the recess of said retainer ring being adapted to receive telescopically a second identical retaining ring and to permit rotation thereof to any relative angular position therebetween.

4. A mount for supporting an optical element with respect to a barrel ring of an optical system, said mount comprising in combination: A separate pair of concentric rings, one of which pair is adapted to be secured to the system in alignment with the barrel ring and to engage the other of said pair of rings, said other of said pair of rings being adapted to support the optical element and to be relatively rotated to any angular position with respect to said one of said pair of rings; each of said pair of rings having a ceramic permanent magnet defining a concentric surface of revolution of permanently magnetic material rigidly imbedded therein; said permanent magnet of each ring being so magnetized that the permanent field of said one ring coacts with the permanent field of said other ring to attract said rings together in one angular position of said pair of rings, and to be free of attraction between said rings in another angular position of said pair of rings.

5. A mount for supporting an optical element with respect to a barrel ring of an optical system, said mount comprising in combination: A separate pair of concentric rings, one of which pair is adapted to be secured to the system in alignment with the barrel ring and to engage the other of said pair of rings, said other of said pair of rings being adapted to support the optical element and to be relatively rotated to any angular position with respect to said one of said pair of rings; each of said pair of rings having a ceramic permanent magnet defining a concentric surface of revolution of permanently magnetic material rigidly imbedded therein; said permanent magnet of each ring having a magnetic field in which unlike magnetic polarities extend in one axial direction and unlike magnetic polarities extend in the opposite axial direction, said polarities being so disposed that for one angular position of said pair of rings the unlike polarities of one ring coact with opposite polarities of the other ring to attract the rings together axially, and so that in another angular position of said pair of rings the unlike polarities of said one ring coact with similar polarities of the other ring to repel the rings axially.

6. A mount for supporting a plurality of separate optical elements with respect to a barrel ring of an optical system, said mount comprising in combination: A magnetically permeable portion rigidly associated with the barrel ring; a number of optical element retainer ring assemblies each adapted to rigidly support one of the optical elements, and each having a continuous coaxial surface of revolution which is engageable in an axial direction with an adjacent one of said ring assemblies except that the surface of revolution of one of the endmost ring assemblies is engageable in an axial direction with said system and is disposed substantially coaxially with said barrel ring; each of said optical element retainer ring assemblies rigidly including an annular permanent magnet having a coaxial cylindrical magnetization including a plurality of unlike poles extending in each of the axial directions, the unlike poles at one end of said magnet terminating substantially in said surface of revolution of the corresponding ring assembly, the unlike poles at said surface of said one of said endmost ring assemblies acting directly in an axial direction on said magnetically permeable portion for effecting support and to be bridged thereby, and the unlike poles of the other ring assembles coacting with opposite poles of adjacent ring assemblies for support; each of said ring assemblies being selectably rotatable as a unit about its axis to any angular position with respect to the barrel ring; and a magnetically permeable bridging member carried by the other of the endmost ring assemblies which is most remote from said magnetically permeable portion, said bridging member providing a low reluctance magnetic path between the outermost unlike poles to thereby increase the magnetic attraction between said magnets and between said magnetically permeable portion and the adjacent magnet.

References Cited in the file of this patent

UNITED STATES PATENTS

| | | |
|---|---|---|
| 2,147,482 | Butler | Feb. 14, 1939 |
| 2,438,231 | Schultz et al. | Mar. 23, 1948 |
| 2,496,099 | Leto | Jan. 31, 1950 |
| 2,557,634 | Cox | June 19, 1951 |
| 2,570,625 | Zimmerman et al. | Oct. 9, 1951 |
| 2,678,228 | Gerhardt | May 11, 1954 |
| 2,794,360 | Eagle | June 4, 1957 |
| 2,806,704 | Burdett | Sept. 17, 1957 |
| 2,893,551 | Pirwitz | July 7, 1959 |

FOREIGN PATENTS

| | | |
|---|---|---|
| 622,632 | Great Britain | May 4, 1949 |
| 915,421 | France | July 22, 1946 |